April 17, 1962 J. M. N. HANLET 3,030,541
ELECTROLUMINESCENT COMPOSITIONS
Filed Dec. 28, 1956
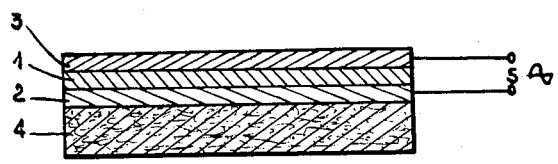
Inventor
Jacques M. N. Hanlet
By Ralph B. Stewart
attorney 3,030,541
ELECTROLUMINESCENT COMPOSITIONS
Jacques Marie Noël Haulet, Paris, France, assignor to Societe d'Electronique et d'Automatisme, Courbevoie, France
Filed Dec. 28, 1956, Ser. No. 631,226
Claims priority, application France Dec. 30, 1955
4 Claims. (Cl. 313—108)

The present invention relates to electroluminescent compositions for use mainly in electro-optical devices wherein at least one layer of such a composition is used as a semi-dielectric layer between a pair of electrically conducting electrodes one of which at least is translucent.

Up to now, the most commonly used compositions have been made from the association of sulfides, sulfoselenides and sometimes silicates of such metals as, for instance, zinc, barium and cadmium, together with small percentages of such activating materials as metallic salts of manganese, silver or copper, to cite a few of the most frequently used components. It is further well known that the quality of the light emitted from such compositions when activated from the application there to of an A.C. voltage difference depends of the metal activator included therein: for instance, manganese will give to the composition a maximum of its light emission at about 6,000 A., and silver, at about 4,500 A.; the use of copper will make the light emission of the composition substantially cover the complete span of the visible spectrum of light wavelengths.

In preparing certain of these known compositions of electroluminescent characteristics, some percentage of oxides of the basic materials, which is to say of the materials which will be activated in the final product from the presence of the above-mentioned activators, has been mentioned as existing in the initial mixture of powders but it must be noted that, on the one part, this percentage has not been mentioned as higher than 20% and, on the other part, steps had always been taken in the remaining process of manufacturing of the final products for substantially eliminating the said oxides: for instance, it has been the practice to wash these powders in acetic acid or ammonium acetate for duly dissolving the said oxides in the same acid medium before processing the powdered mixture up to its final state.

In contradistinction therewith, the present invention provides such compositions of electroluminescent materials that are wholly constituted by the association of at least one oxide of an activating material and at least one oxide of a material activated therefrom, the weight ratio of the activating material to the activated material therein being not higher than one percent and the said composition being made of a crystalline mixture of the said oxides at a macroscopic scale.

According to a further feature of the invention, such a composition of oxides includes an additional percentage of molecules of a nonmetallic material, viz. oxygen, which are not chemically combined with the oxides contained therein.

It has been established that such compositions do present electroluminescent properties which are at least as good as those of the sulfide, sulfoselenide and silicate made compositions and actually present a better efficiency than those known compositions in that they need less electrical energy for driving their electroluminescence condition to the same level of the light emitted therefrom.

Efficient electroluminescent compositions according to the invention have mainly been obtained from zinc, cadmium, barium and calcium oxides as activated components thereof and from copper, lead, manganese, silver, thallium, selenium and germanium oxides as activating materials therefore, but apparently such a listing is not limitative per se.

Compositions according to the invention may be obtained as follows:

The oxides are mixed in the required weight ratio in a ball grinding mill within alcohol or acetone. The grinding operation lasts fifty hours at least until the powders are brought to a granulometric condition such that the larger particles do not exceed five microns.

The mixture of powder materials is then dried and placed into a silica crucible for application thereto of a thermic treatment which will ensure the required crystallisation and formation of the electroluminescent composition. Such a step may be made within an unconditioned atmosphere but it may be of advantage as it will be herein under described, to proceed to such a thermal formation within an atmosphere of pure oxygen established to a certain constant pressure. This will enhance or reinforce the performances of the final product. But, of course, a similar result may be obtained by first crystallizing the powder mixture in air and further processing the material composition for diffusing therein the additional oxygen, as it will also be hereinunder described.

In both cases, the application of heat to the crucible may be controlled as follows: the temperature is first raised according to a linear law with respect to the time up to 1000 to 1200° C. and then maintained at such a maximum value during a time interval averaging one-half hour. Apparently these values will depend on the kind of oxides which are used. The temperature is then lowered according to an exponential law with respect to the time down to the normal.

The composition obtained from this operation may be mixed with such a material as wax, cellulose, plastic rosin or the like and the mixture resulting from the incorporation of such an adhesive in the oxide composition may be applied to an electrically conducting electrode by spraying, laminating or merely painting it thereupon. The thin layer resulting from this operation may then be coated with the other electrode, for instance by evaporating thereupon a metallic translucent film, which completes the electro-optical converter structure.

In this structure, the composition according to the invention acts as a semi-dielectric and the operation there of may be summarized as follows: when an alternating electrostatic field is applied to the electrode, electrons are freed in the particles of the activating component of the said composition. These electrons lose their energies within the particles of the activated component and produce therein an emission of photons. The lower the resistance of the activating material the better is the efficiency of the composition as the lower will then be the slowing of electrons before they can reach the activated photoemissive particles. And further, the higher is the resistance of the said activated material the better since this material will then present a higher useful effect of semiconductance in the device.

The provision, according to an above-mentioned feature of the invention, of an excess of molecules of oxygen within the electroluminescent compositions reinforces at least the properties of the activating material therein as it lowers the resistivity thereof. For certain activated component, zinc oxide for instance, it will also reinforce the properties of the activated material as it produces an increase of the electrical resistance thereof.

A first method for introducing this excess of oxygen into the composition is, as said, to make the heat treatment for crystallisation within an atmosphere of pure oxygen and, particularly, to provide a pressure of the said atmosphere from $10^{-1}$ to $10^{-2}$ millimeters of Hg. The percentage of free oxygen in the resulting composition will be automatically set according to the temperature of crystallisation of the composition, temperature which is of course adapted to such a pressure of the said atmosphere. A second method consists, as said, in diffusing atoms of oxygen into a crystalline layer of the composition prepared in an air atmosphere. Once the layer is deposited upon an electrode, this aggregate is placed into oxygen and is heated to a temperature appropriate for such a diffusion process without affecting the adhesive of the layer or, on the other hand, reinforcing the action of this adhesive when this latter consists of a thermosetting material.

In the drawing, a thin semi-dielectric layer constituted by a composition according to the invention is shown at 1, between two pellicular electrodes 2 and 3 of a metal such as aluminium for instance. One of these electrodes has been previously deposited upon a translucent dielectric base plate 4. Across the electrodes is applied an alternative E.M.F. from an A.C. source 5.

Having now described and ascertained my invention, I claim:

1. An electroluminescent composition, the active comnents of which constitute a semi-dielectric consisting essentially of a homogeneous mixture of metal oxides in their crystalline state, at least one of said oxides having luminescence which is produced by activation thereof by the electronic emission from another oxide in said mixture, the proportion of the activating oxide not exceeding about 1% by weight based on the weight of the activated oxide, the activated oxide being selected from the class consisting of zinc, cadmium, barium and calcium oxides, while the activating oxide is selected from the class consisting of manganese, lead, copper, silver, thallium and germanium oxides, said composition having a small amount of uncombined oxygen present therein resulting from the crystallization of a powdered mixture of said oxides in an oxidizing atmosphere.

2. In the manufacture of electroluminescent compositions, the process which consists essentially in mixing and grinding together metal oxides, at least one of which is selected from the class consisting of zinc, cadmium, barium and calcium oxides and at least one of which is selected from the class consisting of manganese, lead, copper, silver, thallium and germanium oxides, the proportion of the second oxide in the mixture not exceeding 1% based on the weight of the first oxide, the grinding operation being conducted in the presence of an organic liquid selected from the class consisting of alcohol and acetone and being continued until the largest particles do not exceed about 5 microns in diameter, drying the resulting mixture and exposing it to an atmosphere of pure oxygen, gradually heating the mixture to a temperature within the range of from about 1000° to 1200° C. and holding it at said elevated temperature for about one half hour, then rapidly cooling to room temperature, applying the resulting composition in a layer to an electrically conducting electrode, finally applying over said layer another electrically conducting electrode; whereby when the assembly is subjected to an alternating current the first mentioned oxide becomes activated by an electronic emission derived from the second mentioned oxide to produce electroluminescence.

3. The process of claim 2 wherein the oxide mixture is subjected to a reduced pressure ranging from about $10^{-1}$ to $10^{-2}$ mm. of mercury during its exposure to oxygen.

4. An electroluminescent device comprising a pair of electrically conducting electrodes, at least one of which is translucent, and therebetween a semi-dielectric layer of an electroluminescent composition, the active components of which consist essentially of a mixture of metal oxides in their crystalline state, at least one of said oxides having a luminescence which is produced by activation thereof by the electronic emission from another oxide in said mixture, the proportion of the second activating oxide not exceeding 1% by weight based on the weight of the activated oxide, the activated oxide being selected from the class consisting of zinc, cadmium, barium and calcium oxides, while the activating oxide is selected from the class consisting of manganese, lead, copper, silver, thallium and germanium oxides, and said electroluminescent composition further containing a small amount of uncombined oxygen resulting from the crystallization of a powdered mixture of said oxides in an atmosphere of pure oxygen at a sub-atmospheric pressure.

References Cited in the file of this patent

UNITED STATES PATENTS

| | | |
|---|---|---|
| 2,392,814 | Froelich | Jan. 15, 1946 |
| 2,408,475 | Nickle | Oct. 1, 1946 |
| 2,566,349 | Mager | Sept. 4, 1951 |
| 2,590,411 | Isenberg | Mar. 25, 1952 |
| 2,628,201 | Smith | Feb. 10, 1953 |
| 2,698,915 | Piper | Jan. 4, 1955 |
| 2,736,712 | Runciman | Feb. 28, 1956 |
| 2,785,137 | Ranby | Mar. 12, 1957 |

OTHER REFERENCES

Randall: "Fluorescent Comp. Containing Manganese," Royal Soc. Warren Res. Fellow Physics Dept., Birmingham University (December 1938), vol. CLXX, pp. 272–292.

Kaisel: J. Optical Soc. of America, vol. 44, No. 2, February 1954, pp. 134–139.